(12) United States Patent
Huang et al.

(10) Patent No.: US 11,296,387 B2
(45) Date of Patent: Apr. 5, 2022

(54) BATTERY PACK AND VEHICLE

(71) Applicant: Contemporary Amperex Technology Co., Limited, Ningde (CN)

(72) Inventors: Haihua Huang, Ningde (CN); Tingting Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/232,202

(22) Filed: Apr. 16, 2021

(65) Prior Publication Data
US 2021/0234227 A1   Jul. 29, 2021

Related U.S. Application Data

(63) Continuation of application No. PCT/CN2020/125816, filed on Nov. 2, 2020.

(30) Foreign Application Priority Data

Nov. 19, 2019   (CN) .......................... 201911133282.1

(51) Int. Cl.
*H01M 50/209* (2021.01)
*H01M 50/291* (2021.01)
(Continued)

(52) U.S. Cl.
CPC ..... *H01M 50/291* (2021.01); *H01M 10/0525* (2013.01); *H01M 50/209* (2021.01);
(Continued)

(58) Field of Classification Search
CPC .......................... H01M 50/291; H01M 50/244
See application file for complete search history.

(56) References Cited

U.S. PATENT DOCUMENTS

2019/0221796 A1*   7/2019   Kamo ................... H01M 50/20
2021/0175572 A1*   6/2021   He ...................... H01M 10/625

FOREIGN PATENT DOCUMENTS

CN        206332083 U      7/2017
CN        107068934 A      8/2017
(Continued)

OTHER PUBLICATIONS

PCT International Search Report for PCT/CN2020/125816, dated Feb. 5, 2021, 14 pages.
(Continued)

*Primary Examiner* — Ula C Ruddock
*Assistant Examiner* — Thomas H. Parsons
(74) *Attorney, Agent, or Firm* — Law Offices of Liaoteng Wang

(57) ABSTRACT

The disclosure provides a battery pack and a vehicle. The battery pack includes: a housing including a housing bottom wall and a housing side wall which form an accommodating space; a battery module disposed in the accommodating space and including a plurality of batteries, where a case side wall of the battery includes two first side walls oppositely disposed along a first direction and two second side walls oppositely disposed along a second direction; and a frame structure disposed in the accommodating space, which includes a first beam and a second beam respectively located at two ends of the battery module along the first direction, the first beam and the second beam extend along the second direction and are disposed opposite to the first side wall along the first direction, the first beam is non-detachably connected to the housing, and the second beam is detachably connected to the housing.

20 Claims, 8 Drawing Sheets

(51) Int. Cl.
*H01M 50/249* (2021.01)
*H01M 50/244* (2021.01)
*H01M 50/593* (2021.01)
*H01M 10/0525* (2010.01)

(52) U.S. Cl.
CPC ....... *H01M 50/244* (2021.01); *H01M 50/249* (2021.01); *H01M 50/593* (2021.01); *H01M 2220/20* (2013.01)

(56) References Cited

FOREIGN PATENT DOCUMENTS

| | | |
|---|---|---|
| CN | 207800720 U | 8/2018 |
| CN | 208422982 U | 1/2019 |
| CN | 208433446 U | 1/2019 |
| CN | 109585705 A | 4/2019 |
| CN | 109742281 A | 5/2019 |
| CN | 109802062 A | 5/2019 |
| CN | 110027493 A | 7/2019 |
| CN | 110137401 A | 8/2019 |
| CN | 209344162 U | 9/2019 |
| EP | 3486101 A1 | 5/2019 |
| FR | 3011776 A1 | 4/2015 |
| JP | 2010177116 A | 8/2010 |
| WO | 2019039139 A1 | 2/2019 |

OTHER PUBLICATIONS

The First Office Action for Chinese Application No. 201911133282.1, dated Jul. 16, 2021, 29 pages.
The extended European search report for European Application No. 20873377.4, dated Dec. 7, 2021, 21 pages.

* cited by examiner

BATTERY PACK AND VEHICLE

CROSS-REFERENCE TO RELATED APPLICATION

This application is a continuation of International Application No. PCT/CN2020/125816, filed on Nov. 2, 2020, which claims priority to Chinese Patent Application No. 201911133282.1, filed on Nov. 19, 2019, both of which are incorporated herein by reference in their entireties.

FIELD

The disclosure relates to a technical field of battery, and in particular to a battery pack and a vehicle.

BACKGROUND

In the relevant technology, a battery pack applied in a vehicle includes at least one battery module, which includes a plurality of batteries, usually secondary lithium-ion batteries. A process of using the battery pack is a process of multiple charge-discharge cycles of the secondary lithium-ion batteries. During charge-discharge cycles of a battery, positive and negative electrode plates in an electrode assembly of a battery will cause periodic expansion of the battery due to structural changes or side reactions of active materials. As the life cycle of the battery grows, an expansion force generated during the periodic expansion will gradually increase.

A hard case battery applied in a battery pack generally has a square structure, and the battery includes a case and a cap. The case includes a case bottom wall opposite to the cap and a case side wall disposed between the cap and the case bottom wall. The case side wall generally includes two first side walls disposed opposite to each other and two second side walls disposed opposite to each other and connected between the two first side walls, and an area of the second side wall is smaller than that of the first side wall. A main direction of an expansion force is along a direction perpendicular to the first side wall, and therefore, an increase of the expansion force will have a greater impact on the first side wall of the battery; and for a battery module in the form of a battery set, the expansion force generates a greater pressure on end plates of the battery module. In order to resist the increase of the expansion force, end plates with a certain structural strength are generally used to avoid excessive expansion and deformation of the battery, which affects a performance of the battery during the cycles. Also, the structure of the end plate shall not exert excessive pressure on the battery, and otherwise the battery will likely cause lithium plating during the charge-discharge cycles, which reduces the life cycle of the battery.

SUMMARY

A first aspect of the disclosure provides a battery pack, including:

a housing including a housing bottom wall and a housing side wall, wherein the housing bottom wall and the housing side wall form an accommodating space;

a battery module disposed in the accommodating space and including a plurality of batteries, wherein a case side wall of the battery includes two first side walls oppositely disposed along a first direction and two second side walls oppositely disposed along a second direction, an area of the first side wall is larger than an area of the second side wall, and the first direction and the second direction are both parallel to the housing bottom wall and perpendicular to each other; and a frame structure disposed in the accommodating space for limiting a position of the battery module, wherein the frame structure includes a first beam and a second beam respectively located at two ends of the battery module along the first direction, the first beam and the second beam extend along the second direction and are disposed opposite to the first side wall along the first direction, the first beam is non-detachably connected to the housing, and the second beam is detachably connected to the housing.

In some embodiments, the first beam is welded to the housing.

In some embodiments, the first beam includes:
a first beam top wall;
a first beam side wall extending towards the housing bottom wall from two ends of the first beam top wall along the first direction; and
a first beam mounting edge extending from an end of the first beam side wall close to the housing bottom wall in a direction away from the first beam side wall, wherein the first beam is non-detachably connected to the housing bottom wall through the first beam mounting edge.

In some embodiments, the second beam is a plate beam.
In some embodiments, the first beam is integrally formed by bending of a plate, which has a thickness that is 0.2 to 0.5 times a plate thickness of the second beam.

In some embodiments, the battery pack further includes:
a first insulating plate disposed between the first beam and the battery module; and/or
a second insulating plate disposed between the second beam and the battery module.

In some embodiments, the frame structure includes a third beam and a fourth beam respectively located at two ends of the battery module along the second direction and fixed in the housing, the third beam and the fourth beam extend along the first direction and are disposed opposite to the second side wall along the second direction, and two ends of the second beam along the second direction are detachably connected to an end of the third beam close to the second beam and an end of the fourth beam close to the second beam, respectively.

In some embodiments,
the third beam includes a third beam end recess at the end of the third beam close to the second beam;
the fourth beam includes a fourth beam end recess at the end of the fourth beam close to the second beam; and
the two ends of the second beam along the second direction are respectively disposed in the third beam end recess and the fourth beam end recess and are detachably connected to the third beam and the fourth beam, respectively.

In some embodiments, a central portion of the second beam along the second direction is detachably connected to the housing.

In some embodiments, the frame structure includes a protrusion fixedly disposed on a middle portion of the second beam at a side of the second beam away from the battery module along the first direction, and the middle portion of the second beam is detachably connected to the housing through the protrusion.

In some embodiments, the battery pack includes a fifth beam disposed in the accommodating space, the fifth beam extends in the second direction and is located between the second beam and the housing side wall, the second beam is located between the fifth beam and the battery module and has a spacing from the fifth beam in the first direction, the fifth beam is fixedly connected to the housing bottom wall, and the protrusion is detachably connected to the fifth beam.

In some embodiments, the battery pack includes a fifth beam disposed in the accommodating space, the fifth beam extends in the second direction and is located at an end of the battery module where the second beam is disposed, the second beam is located between the fifth beam and the battery module and has a spacing from the fifth beam in the first direction, and the fifth beam is fixedly connected to the housing bottom wall.

In some embodiments, the frame structure includes a third beam and a fourth beam respectively located at two ends of the battery module along the second direction and fixed in the housing, the third beam and the fourth beam extend along the first direction and are disposed opposite to the second side wall along the second direction, two ends of the second beam along the second direction are detachably connected to an end of the third beam close to the second beam and an end of the fourth beam close to the second beam, respectively; and the first beam, the second beam, the third beam and the fourth beam have dimensions along a third direction greater than that of the fifth beam along the third direction, and the third direction is perpendicular to the housing bottom wall.

In some embodiments, the frame structure includes a third beam and a fourth beam respectively located at two ends of the battery module along the second direction and fixed in the housing, the third beam and the fourth beam extend along the first direction and are disposed opposite to the second side wall along the second direction, two ends of the second beam along the second direction are detachably connected to an end of the third beam close to the second beam and an end of the fourth beam close to the second beam, respectively; and the end of the third beam close to the second beam and the end of the fourth beam close to the second beam respectively abut against a side of the fifth beam close to the battery module.

In some embodiments, the second beam includes a second beam side recess at a side of the second beam close to the housing bottom wall to avoid the fifth beam, and the spacing is formed between the second beam side recess and the fifth beam.

In some embodiments, the battery pack further includes a third insulating plate disposed in the spacing.

A second aspect of the disclosure provides a vehicle, including:

a power source configured to provide motive power to the vehicle; and a battery pack according to the first aspect of the disclosure, which is configured to provide electric power to the power source.

Based on the battery pack according to the disclosure, the non-detachable first beam and the detachable second beam are respectively disposed at the two ends of the battery module along the first direction perpendicular to the first side wall of the battery in the housing of the battery pack for restraint; and since the second beam is detachable, there is relatively few restrain between the second beam and the housing, and therefore, when the battery module expands, it can be effectively restrained without causing the large surface of the electrode assembly of the battery to be subject to an excessive high force, which facilitates improving a safety performance of the battery pack and prolongs the service life of the battery pack.

The vehicle according to the disclosure includes the battery pack according to the disclosure, and has the same advantages as the battery pack according to the disclosure.

Through the following detailed description of exemplary embodiments of the disclosure with reference to the drawings, other features and advantages of the disclosure will become clear.

BRIEF DESCRIPTION OF THE DRAWINGS

The accompanying drawings illustrated herein are used to provide a further understanding of the disclosure and form a part of the disclosure; and exemplary embodiments of the disclosure and the description thereof are used to explain the disclosure and do not constitute an improper limitation of improper. In the drawings.

DETAILED DESCRIPTION

Figure 1:
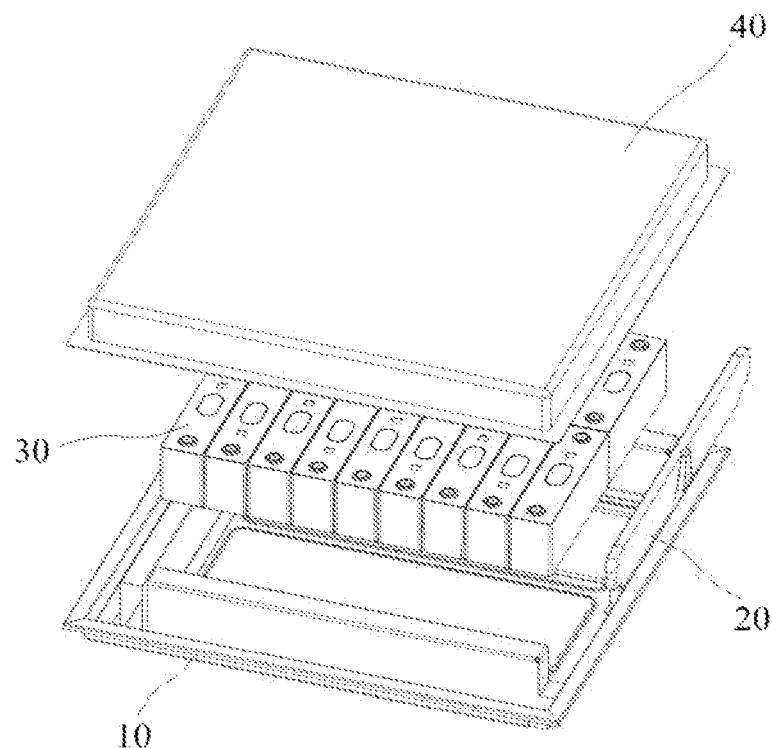
FIG. 1 is an exploded structural view of a battery pack according to an embodiment of the disclosure.

Technical solutions according to embodiments of the disclosure will be clearly and completely described below with reference to the drawings according to embodiments of the disclosure; and obviously, the described embodiments are only some embodiments of the disclosure, rather than all embodiments. The following description of at least one exemplary embodiment is actually only illustrative, and is by no means as any limitation on the disclosure and its application or use. Based on the embodiments in the disclosure, all other embodiments obtained by those of ordinary skill in the art without creative work shall fall within the protection scope of the disclosure.

Unless otherwise specified, relative arrangement of components and steps, numerical expressions and values set forth in these embodiments do not limit the scope of the disclosure. Also, it should be understood that, for ease of description, dimensions of various components shown in the drawings are not drawn in accordance with actual proportional relationships. Techniques, methods and apparatus known to those of ordinary skill in the art may not be discussed in detail, but where appropriate, the techniques, methods and apparatus should be considered as part of the allowed specification. In all examples shown and discussed herein, any specific values should be construed as merely exemplary and not as limitations. Thus, other examples of exemplary embodiments may have different values. It should be noted that similar symbols and letters denote similar items in the following drawings, so once an item is defined in one drawing, it is not required to further discuss it in subsequent drawings.

In the description of the disclosure, it should be understood that the use of terms such as "first" and "second" to define components is only for the convenience of distinguishing the corresponding components; and the above terms have no special meaning if not otherwise stated, and therefore cannot be construed as limitations on the scope of protection of the disclosure.

In the description of the disclosure, it should be understood that orientations or position relationships indicated by orientation terms such as "front, back, top, bottom, left, right", "horizontal, vertical, perpendicular, horizontal" and "top, bottom" are used only to facilitate the description of the disclosure and simplify the description; and in the absence of a statement to the contrary, these orientation terms do not indicate and imply that devices or components referred to must have a specific orientation or be constructed and operated in a specific orientation, and therefore cannot be understood as limitations on the scope of protection of the disclosure; and orientation terms "internal and external" refer to interior and exterior relative to a contour of each component itself.

As shown in FIGS. 1 to 14, embodiments of the disclosure provide a battery pack, which includes a housing 10, a frame structure 20, and a battery module.

The housing 10 includes a housing bottom wall 11 and a housing side wall 12; and the housing bottom wall 11 and the housing side wall 12 form an accommodating space V.

The battery module is disposed in the accommodating space V, and includes a plurality of batteries 30.

Figure 3:
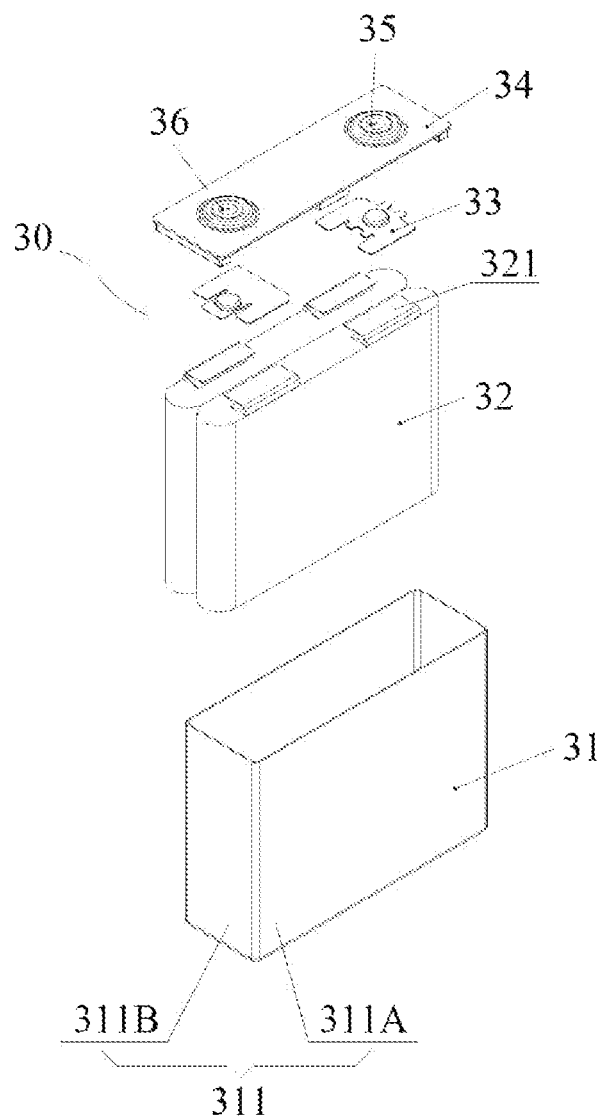
FIG. 3 is an exploded structural view of a battery of a battery pack according to an embodiment of the disclosure.
Figure 12:
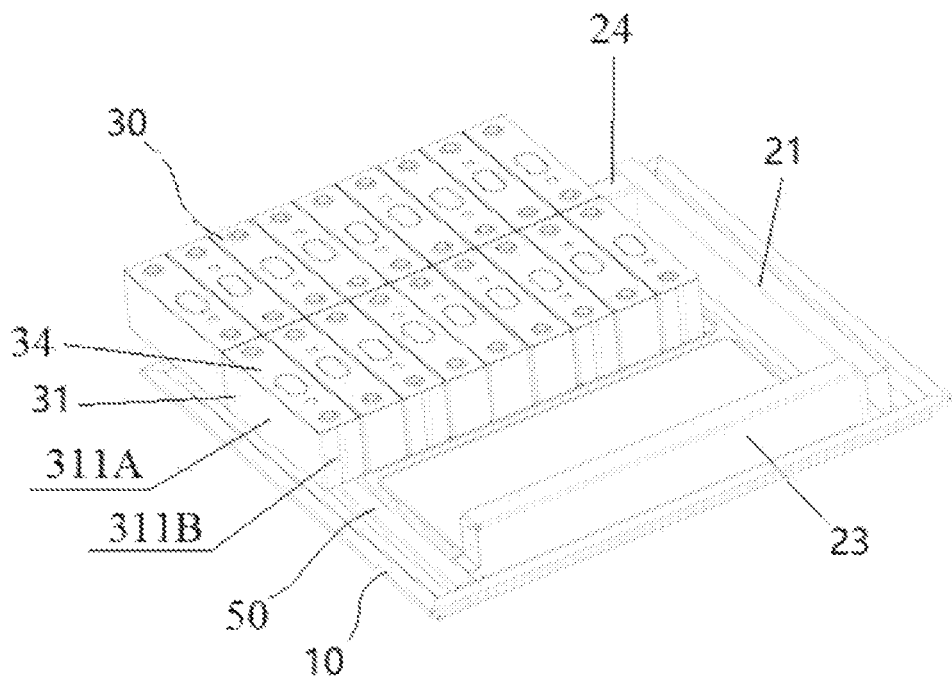
FIG. 12 is a schematic structural view of the battery pack as shown in FIG. 2 during a process in which a battery module is being mounted in a combined structure of a housing and a frame structure (not including a second beam and a protrusion).

As shown in FIGS. 3 and 12, the battery 30 includes a case 31 and a cap 34. The case 31 includes a case bottom wall opposite to the cap 34 and a case side wall 311 disposed between the cap 34 and the case bottom wall. The case side wall 311 includes two first side walls 311A oppositely arranged along a first direction X and two second side walls 311B oppositely arranged along a second direction Y with an area smaller than that of the first side wall 311A.

Figure 2:
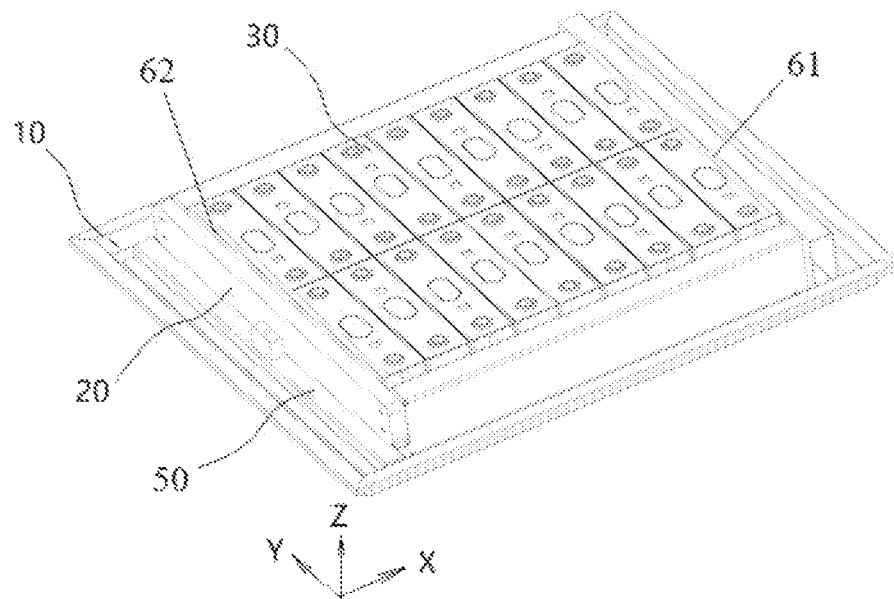
FIG. 2 is a structural schematic diagram of a battery pack (not including a cover) according to an embodiment of the disclosure.

As shown in FIG. 2, the first direction X and the second direction Y are both parallel to the housing bottom wall 11, and the first direction X is perpendicular to the second direction Y. A third direction Z is perpendicular to the housing bottom wall 11.

In some embodiments, the first direction X is a width direction of the battery pack, the second direction Y is a length direction of the battery pack, and the third direction Z is a height direction of the battery pack.

As shown in FIG. 3, the battery 30 further includes an electrode assembly 32 and a connecting plate 33, which are located in a space enclosed by the case 31 and the cap 34. A tab 321 of the electrode assembly 32 includes a positive tab and a negative tab, the positive tab and the negative tab are electrically connected to two connecting plates 33 respectively, the two connecting plates 33 are respectively connected to a first electrode terminal 35 and a second electrode terminal 36 disposed on the cap 34, and the first electrode terminal 35 and the second electrode terminal 36 are used to be electrically connected to objects external to the battery 30 to transmit electric energy.

The frame structure 20 is disposed in the accommodating space V for limiting a position of the battery module; the frame structure 20 includes a first beam 21 and a second beam 22 respectively located at two ends of the battery module along the first direction X; the beam 21 and the second beam 22 extend along the second direction Y and are disposed opposite to the first side wall 311A along the first direction X; the first beam 21 is non-detachably connected to the housing 10, and the second beam 22 is detachably connected to the housing 10.

A fixed connection refers to a connection in which two connected members cannot move relative to each other, and specifically includes a detachable connection and a non-detachable connection; the detachable connection refers to a connection in which when two connected members are disassembled and separated from a connected state, structures of the two connected members will not be damaged, such as threaded connection, key connection, pin connection, etc.; the non-detachable connection refers to a connection in which when two connected members are disassembled and separated from a connected state, structures of the two connected members will be damaged, such as welding, riveting, bonding, or a combination of riveting and bonding, etc. For example, in some embodiments of the disclosure, the first beam 21 is welded to the housing 10.

An expansion force of the battery 30 mainly comes from the expansion of the electrode assembly 32 in the case 31; since the first side wall 311A of the battery 30 has a largest area and the electrode assembly 32 has a largest projection area on the first side wall 311A, this causes the first side wall 311A of the battery 30 to be subject to the greatest expansion force or expansion deformation. The more batteries 30 are stacked in the first direction X perpendicular to the first side walls 311A of the batteries 30, the greater the accumulated expansion force or expansion deformation. Since the electrode assembly 32 of the battery 30 will expand during the charge-discharge cycles, if it is not restrained, the expansion deformation will be very large, which greatly affects the charge-discharge cycle performance of the battery 30. If the first side wall 311A of the battery 30 is excessively restrained, a large surface of the electrode assembly 32 corresponding to the first side wall 311A of the battery 30 will be subject to a high force, which will likely cause lithium plating and thus affect the service life of the battery 30. Therefore, it is necessary to provide, at a level of the battery module, a design in which free expansion of the first side wall 311A of the battery 30 will be restrained.

In embodiments of the disclosure, a non-detachable first beam 21 and a detachable second beam 22 are respectively disposed at two ends of the battery module along the first direction X in the housing 10 of the battery pack for restraint. Since the second beam 22 is detachable, there is relatively few restrain between the second beam 22 and the housing 10, and therefore, when the battery module expands, it can be effectively restrained without causing the large surface of the electrode assembly of the battery 30 to be subject to an excessive high force, which facilitates improving a safety performance of the battery pack and prolongs the service life of the battery pack.

In some embodiments, the frame structure 20 may further include a third beam 23 and a fourth beam 24 respectively located at two ends of the battery module along the second direction Y and fixed in the housing 10; the third beam 23 and the fourth beam 24 extend along the first direction X and are disposed opposite to the second side wall 311B along the second direction Y; and two ends of the second beam 22 along the second direction Y are detachably connected to an end of the third beam 23 close to the second beam 22 and an end of the fourth beam 24 close to the second beam 22, respectively.

The third beam 23 and the fourth beam 24 can be provided to better limit the position of the battery module and improve an overall rigidity of the battery pack.

Figure 4:
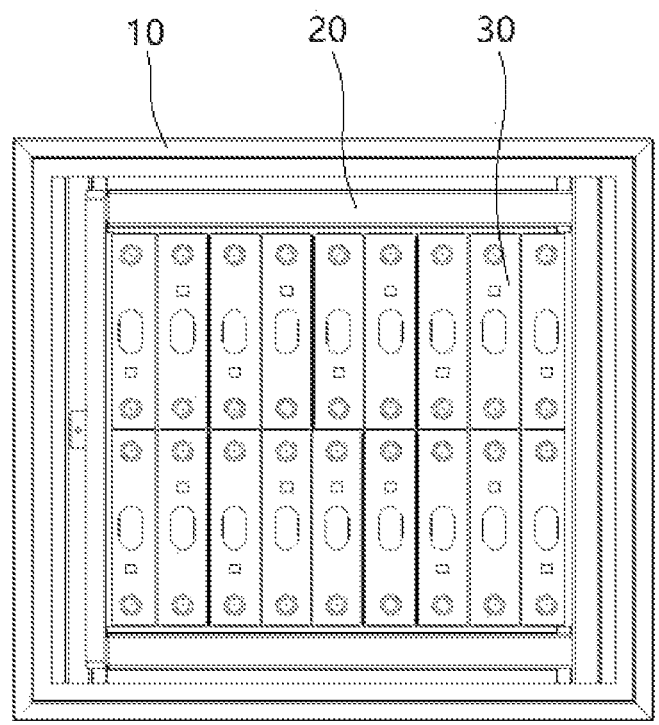
FIG. 4 is a structural schematic top view of FIG. 2.
Figure 5:
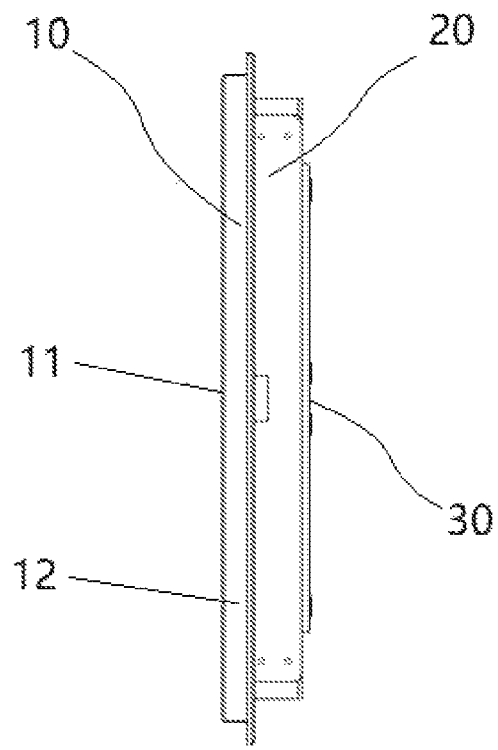
FIG. 5 is a structural schematic side view of FIG. 4.
Figure 6:
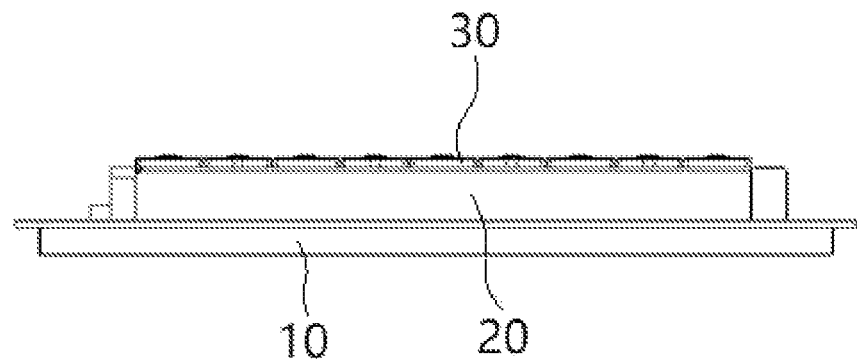
FIG. 6 is a structural schematic bottom view of FIG. 4.
Figure 7:
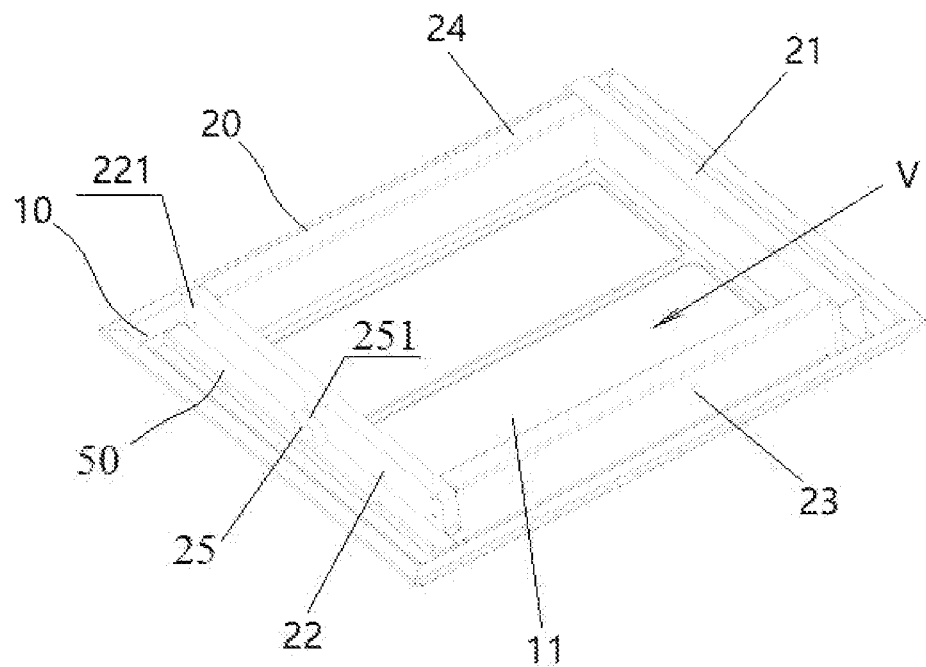
FIG. 7 is a schematic diagram of a combined structure of a housing and a frame structure of the battery pack as shown in FIG. 2.
Figure 8:
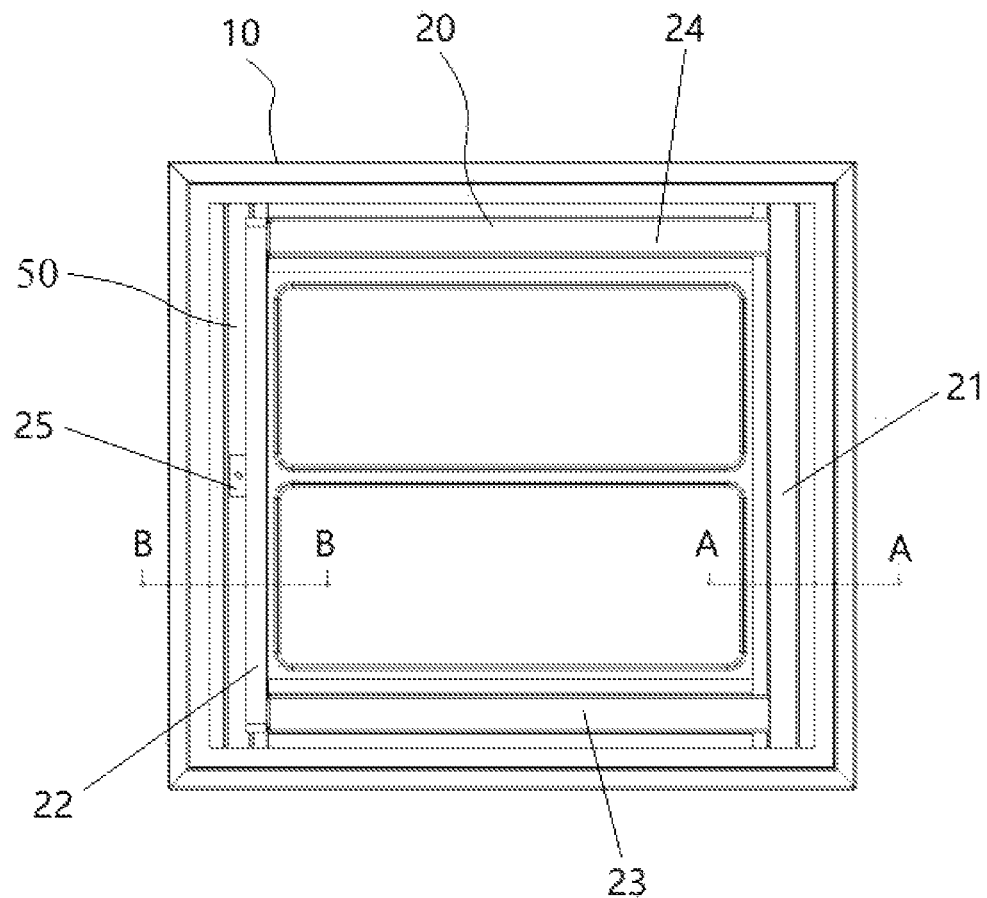
FIG. 8 is a structural schematic top view of FIG. 7.

The case bottom wall of the battery 30 is fixedly connected to the housing bottom wall 11. In some embodiments, the battery module in the battery pack adopts a module-free design, a non-removable first beam 21 is disposed in the accommodating space V to restrain the battery module from outside at an end of the battery module corresponding to the first side wall 311A of the battery 30 (a right end of the battery module as shown in FIG. 4), and a detachable second beam 22 is used to restrain the battery module from outside at an end of the battery module opposite to an end where the first beam 21 is disposed (a left end of the battery module as shown in FIG. 4). Since it is easy for the battery module to enter and exit the space enclosed by the first beam 21, the third beam 23 and the fourth beam 24 after the second beam 22 is disassembled, the battery module can be easily put in or taken out from the side of the second beam 22, which facilitates mounting, detaching and maintenance.

The battery pack further includes a cover 40, which covers the housing 10 to enclose the frame structure 20 and the battery module in the accommodating space V.

As shown in FIGS. 2 and 4 to 14, in some embodiments, the frame structure 20 includes a first beam 21, a second beam 22, a third beam 23, and a fourth beam 24 surrounding the battery module. The first beam 21 and the second beam 22 extend in the second direction Y and are located at two ends of the battery module in the first direction X, respectively. The third beam 23 and the fourth beam 24 extend in the first direction X and are located at two ends of the battery module in the second direction Y, respectively. The first beam 21, the third beam 23 and the fourth beam 24 are all fixedly connected to the housing 10. The second beam 22 is detachably connected to the housing 10. For example, the first beam 21, the third beam 23, and the fourth beam 24 are all welded to the housing 10; the second beam can be connected to the third beam 23 and the fourth beam 24 by screws, or can be connected to the housing 10, or can be simultaneously connected to the third beam 23, the fourth beam 24 and the housing 10.

When the first side wall 311A of the battery 30 is arranged along the length direction of the battery pack, the batteries 30 may be stacked in the width direction of the battery pack. The number of batteries 30 stacked in a direction perpendicular to the first side wall 311A is smaller than the number of batteries 30 stacked when the first side wall 311A is arranged along the width direction of the battery pack. Therefore, when the arrangement direction of the first side wall 311A of the battery 30 is along the length direction of the battery pack, the direction of the accumulated expansion force of the battery pack is mainly along the width direction of the battery pack, which facilitates small overall expansion deformation and expansion force of the battery module, and thereby lowering the strength requirement of the frame that restrains the expansion force or expansion deformation of the batteries 30.

The length direction of the battery pack is usually consistent with a traveling direction of the vehicle; when the traveling direction of the vehicle is the second direction Y, the first beam 21 and the second beam 22 are longitudinal beams arranged along the traveling direction of the vehicle, and the first beam 21 and the second beam 22 are disposed at both ends of the battery module in parallel and spaced apart from each other.

In other embodiments, the first direction X is the length direction of the battery pack, the second direction Y is the width direction of the battery pack, and the third direction Z is the height direction of the battery pack.

Figure 9:
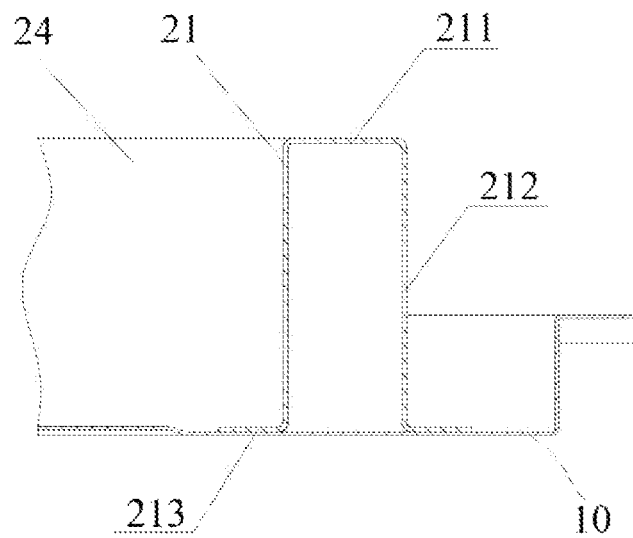
FIG. 9 is an enlarged cross-sectional structural diagram of part A-A in FIG. 8.

As shown in FIG. 9, in some embodiments, the first beam 21 includes a first beam top wall 211, a first beam side wall 212 extending towards the housing bottom wall 11 from two ends of the first beam top wall 211 along the first direction X, and a first beam mounting edge 213 extending from an end of the first beam side wall 212 close to the housing bottom wall 11 in a direction away from the first beam side wall 212. The first beam 21 is non-detachably connected to the housing bottom wall 11 through the first beam mounting edge 213.

The first beam mounting edge 213 is welded to the housing bottom wall 11.

Connecting the first beam mounting edge 213 and the housing bottom wall 11 by welding can improve the overall rigidity of the first beam 21.

In the embodiment, the first beam 21 and the housing bottom wall 11 form a closed geometric structure, which facilitates improving the rigidity of the first beam 21.

In some embodiments, the second beam 22 is a plate beam. The first beam 21 is integrally formed by bending of a plate, which has a thickness that is 0.2 to 0.5 times a plate thickness of the second beam 22. The plate material for manufacturing the first beam 21 and the plate material for manufacturing the second beam 22 are the same or have similar properties, for example, such as both being metal materials.

By appropriately configuring the structure of the first beam 21, the thickness of the plate forming the first beam 21 and the thickness of the second beam 22, it facilitates avoiding an excessive rigidity difference between the first beam 21 and the second beam 22 after they are mounted and facilitates uniform expansions of respective batteries 30.

In some embodiments, the plate of the first beam 21 is a metal plate with a thickness of 1.5 mm, and the second beam 22 is a metal plate beam with a thickness of 5 mm. The configuration of the thickness of the metal plate of the first beam 21 and the thickness of the metal plate beam facilitates better restraining the battery module and realizes that restraining forces on the opposite ends of the battery module along the first direction X are substantially same, without causing lithium plating due to excessive local pressure on the battery 30, which helps to improve the life cycle of the battery 30.

Figure 14:
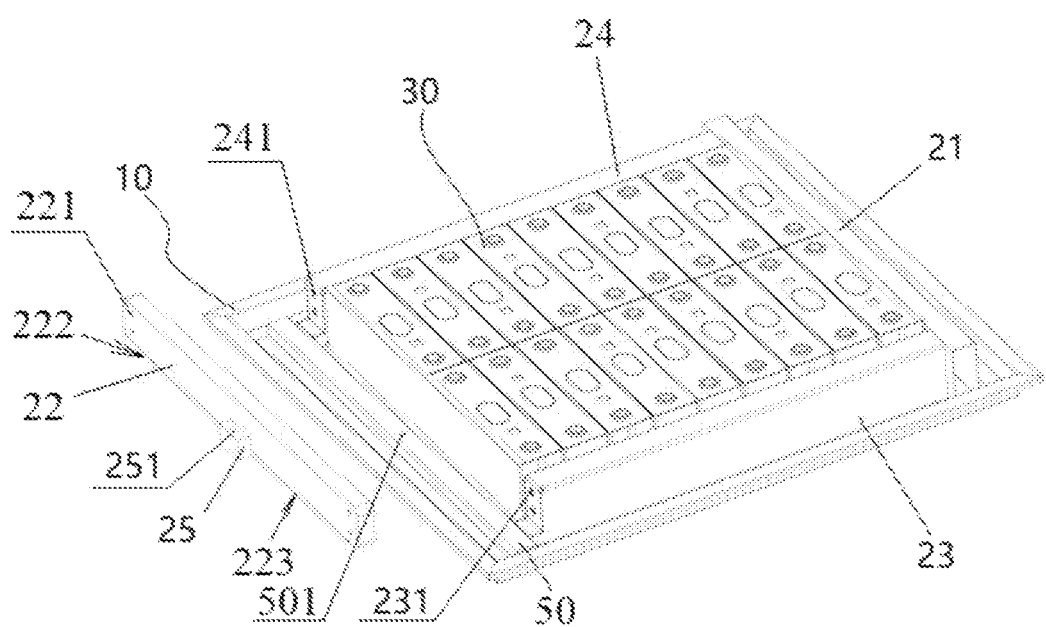
FIG. 14 is a schematic structural view of the battery pack as shown in FIG. 2 after a battery module has been mounted in a combined structure of a housing and a frame structure (not including a second beam and a protrusion), wherein the second beam and the protrusion are going to be assembled with a third beam and a fourth beam of the frame structure.

As shown in FIG. 14, two ends of the second beam 22 along the second direction Y are detachably connected to an end of the third beam 23 close to the second beam 22 and an end of the fourth beam 24 close to the second beam 22, respectively. By connecting the second beam 22 to the third beam 23 and the fourth beam 24 respectively, it facilitates improving the overall stability of the frame structure 20.

In some embodiments, the third beam 23 includes a third beam end recess 232 at the end of the third beam 23 close to the second beam 22; the fourth beam 24 includes a fourth beam end recess 242 at the end of the fourth beam 24 close to the second beam 22; and the two ends of the second beam 22 along the second direction Y are respectively disposed in the third beam end recess 232 and the fourth beam end recess 242 and are detachably connected to the third beam 23 and the fourth beam 24, respectively.

The above arrangement facilitates achieving the accurate positioning of the second beam 22 with respect to the fourth beam 24 and the third beam 23, thereby facilitating the accurate limiting on the battery module by the frame structure 20 and facilitating the rapid detachable connection of the second beam 22 to the fourth beam 24 and the third beam 23.

Figure 13:
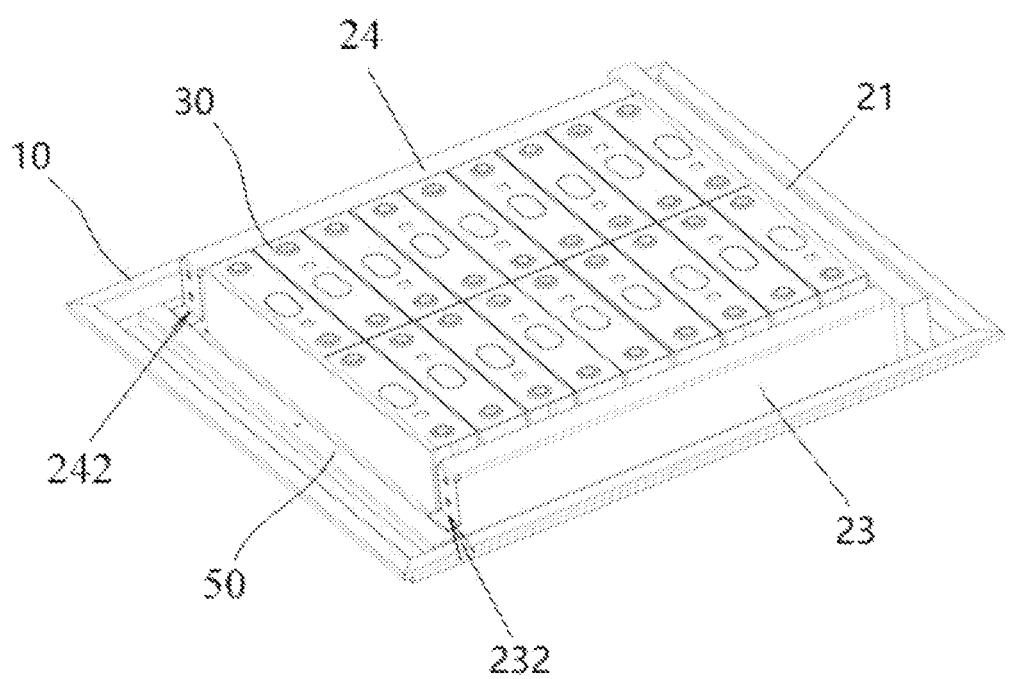
FIG. 13 is a schematic structural view of the battery pack as shown in FIG. 2 after a battery module has been mounted in a combined structure of a housing and a frame structure (not including a second beam and a protrusion).

As shown in FIG. 2, FIG. 13 and FIG. 14, in some embodiments, at the end of the third beam 23 close to the second beam 22, a side of the third beam 23 away from the housing bottom wall 11 is inwardly recessed with respect to a side of the third beam 23 close to the housing bottom wall 11 to form a third beam end recess 232. At the end of the fourth beam 24 close to the second beam 22, a side of the fourth beam 24 away from the housing bottom wall 11 is inwardly recessed with respect to a side of the fourth beam 24 close to the housing bottom wall 11 to form a fourth beam end recess 242. At each of two ends of the second beam 22 along the second direction Y, a side of the second beam 22 close to the housing bottom wall 11 is inwardly recessed with respect to a side of the second beam 22 away from the housing bottom wall 11 to form a second beam end recess 222. An end wall of the third beam end recess 232 and an end wall of the fourth beam end recess 242 are detachably connected to the two ends of the second beam 22 at the side of the second beam 22 away from the housing bottom wall 11, respectively; and the ends of the third beam 23 and the fourth beam 24 close to the second beam 22, at the sides close to the housing bottom wall 11, engage with the second beam end recesses 222 at the two ends of the second beam 22 in a form-fitting manner.

As shown in FIGS. 13 and 14, two threaded holes 231 are disposed along the third direction Z on the end wall of the third beam 23 at the third beam end recess 232. Two threaded holes 241 are disposed along the third direction Z on the end wall of the fourth beam 24 at the fourth beam end recess 242. At each of the two end of the second beam 22, two through holes 221 are disposed along the third direction Z, such that the second beam 22 can be detachably connected to the third beam 23 and the fourth beam 24 by four screws that match with the through holes and the threaded holes.

In some embodiments, a central portion of the second beam 22 along the second direction Y is detachably connected to the housing 10.

By adding a connection point to the housing 10 at the central portion of the second beam 22, it helps to balance the rigidities of the second beam 22 and the first beam 21, balancing the forces on the batteries 30 located at the two ends of the battery module along the first direction X during the charge-discharge cycles and facilitating increasing the life cycles of the batteries 30.

The frame structure 20 includes a protrusion 25 fixedly connected to a middle portion of the second beam 22 at a side of the second beam 22 away from the battery module, and the middle portion of the second beam 22 is detachably connected to the housing 10 through the protrusion 25. The protrusion 25 is provided to facilitate the detachable connection between the second beam 22 and the housing 10.

In some embodiments, the battery pack includes a fifth beam 50 disposed in the accommodating space V. The fifth beam 50 extends in the second direction Y and is located at an end of the battery module where the second beam 22 is disposed. The second beam 22 is located between the fifth beam 50 and the battery module and has a spacing from the fifth beam 50 in the first direction X. The fifth beam 50 is fixedly connected to the housing bottom wall 11.

The arrangement of the fifth beam 50 improves the rigidity of the section of the housing bottom wall 11 where the second beam 22 is disposed, and facilitates maintaining the shapes of the housing bottom wall 11 and the housing 10 to maintain their stabilities, thereby facilitate protecting the battery module. On the other hand, the arrangement of the fifth beam 50 normally does not affect the limiting on the battery module by the second beam 22; and in some extreme cases, it can restrict the second beam 22 from generating excessive deformation towards the side away from the battery module, and facilitates maintaining the stability of the overall structure of the battery pack.

The protrusion 25 is detachably connected to the fifth beam 50. As shown in FIG. 14, the protrusion 25 is fixedly connected to a middle portion of the second beam 22 at a side of the second beam 22 away from the battery module along the first direction X. A through hole 251 with an axis extending in the third direction Z is disposed in a middle portion of the protrusion 25. A threaded hole 501 is disposed in a middle portion of a top end of the fifth beam 50; when the second beam 22 is aligned with the third beam 23 and the fourth beam 24, the through hole 251 is also aligned with the thread 501 are also aligned; and by using a screw to pass through the through hole 251 to fit with the screw hole 501, it realizes the detachable connection between the protrusion 25 and the fifth beam 50 and thereby the detachable connection between the second beam 22 and the housing 10.

As shown in FIGS. 2, 4 to 7, and 9 to 14, in some embodiments, the first beam 21, the second beam 22, the third beam 23 and the fourth beam 24 have dimensions along the third direction Z greater than that of the fifth beam 50 along the third direction Z. Such arrangement facilitates the mounting and detaching of the battery module.

As shown in FIGS. 2, 7, and 11 to 14, in some embodiments, the end of the third beam 23 close to the second beam 22 and the end of the fourth beam 24 close to the second beam 22 respectively abut against a side of the fifth beam 50 close to the battery module. This arrangement facilitates accurately arranging the relative position between the second beam 22 and the fifth beam 50, and also facilitates improving the overall rigidity of the frame structure 20.

Figure 10:
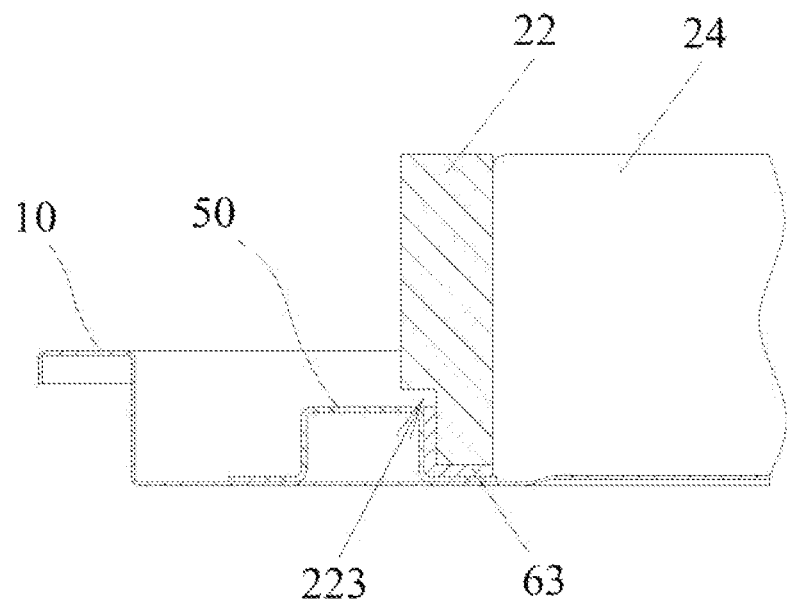
FIG. 10 is an enlarged cross-sectional structural diagram of part B-B in FIG. 8.

As shown in FIGS. 10 and 14, in some embodiments, the second beam 22 includes a second beam side recess 223 at a side of the second beam 22 close to the housing bottom wall 11 to avoid the fifth beam 50. This structure can make the fifth beam 50 closer to the battery module, which is beneficial for the fifth beam 50 to better bear the load of the battery module, and improves the supporting capability of a combined structure of the housing 10 and the frame structure 20 for the battery module.

As shown in FIGS. 2 and 14, in some embodiments, the battery pack further includes a first insulating plate 61 and/or a second insulating plate 62. The first insulating plate 61 is disposed between the first beam 21 and the battery module. The second insulating plate 62 is disposed between the second beam 22 and the battery module.

As shown in FIG. 10, in some embodiments, the second beam 22 includes a second beam side recess 223 at a side of the second beam 22 close to the housing bottom wall 11 to avoid the fifth beam 50, and the spacing between the second beam 22 and the fifth beam 50 is formed between the second beam side recess 223 and the fifth beam 50. Furthermore, the battery pack further includes a third insulating plate 63 disposed in the spacing between the second beam 22 and the fifth beam 50.

By providing the first insulating plate 61, the second insulating plate 62 or the third insulating plate 63, it facilitates improving the safety performance of the battery pack.

In the embodiment, the structures of the third beam 23, the fourth beam 24, and the fifth beam 50 are similar to the structure of the first beam 21.

The third beam 23 includes a third beam top wall, a third beam side wall extending towards the housing bottom wall 11 from two ends of the third beam top wall along the second direction Y, and a third beam mounting edge extending from an end of the third beam side wall close to the housing bottom wall 11 in a direction away from the third beam side wall; and the third beam 23 is fixedly connected to the housing bottom wall 11 through the third beam mounting edge. Optionally, the third beam mounting edge is welded to the housing bottom wall 11.

The fourth beam 24 includes a fourth beam top wall, a fourth beam side wall extending towards the housing bottom wall 11 from two ends of the fourth beam top wall along the second direction Y, and a fourth beam mounting edge extending from an end of the fourth beam side wall close to the housing bottom wall 11 in a direction away from the fourth beam side wall; and the fourth beam 24 is fixedly connected to the housing bottom wall 11 through the fourth beam mounting edge. Optionally, the fourth beam mounting edge is welded to the housing bottom wall 11.

The fifth beam 50 includes a fifth beam top wall, a fifth beam side wall extending towards the housing bottom wall 11 from two ends of the fifth beam top wall along the first direction X, and a fifth beam mounting edge extending from an end of the fifth beam side wall close to the housing bottom wall 11 in a direction away from the fifth beam side wall; and the fifth beam 50 is fixedly connected to the housing bottom wall 11 through the fifth beam mounting edge. The fifth beam mounting edge is welded to the housing bottom wall 11.

An assembling process of the battery pack according to embodiments of the disclosure will be described below with reference to FIGS. 12 to 14.

Figure 11:
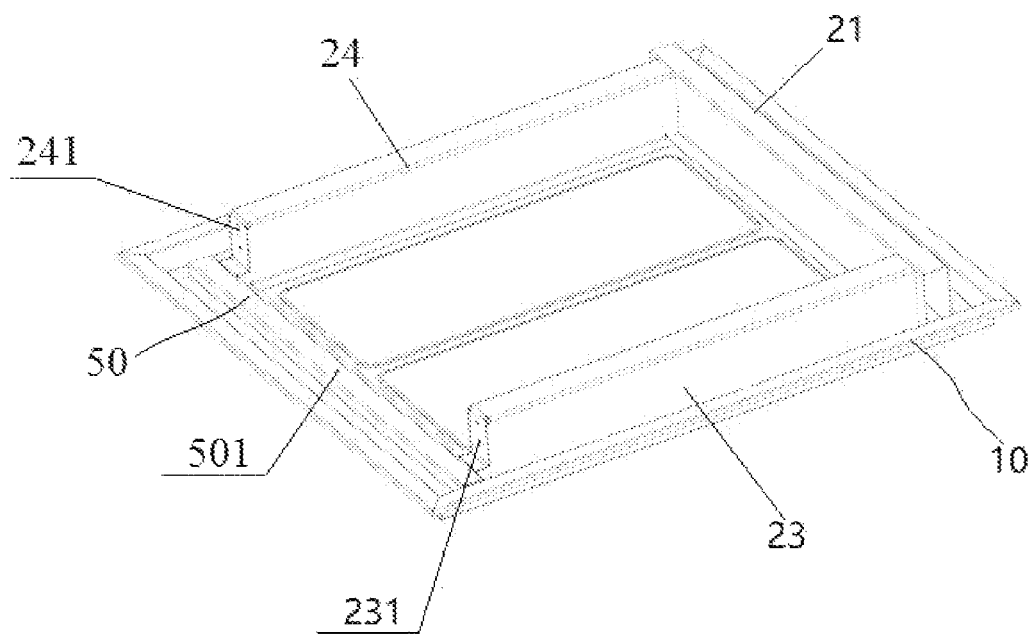
FIG. 11 is a schematic structural view of the combined structure of the housing and the frame structure (not including a second beam and a protrusion) of the battery pack as shown in FIG. 2.

The battery module is assembled in a combined structure of the housing 10 of the battery pack as shown in FIG. 11 and the frame structure that does not include the second beam 22 and the protrusion 25. The case bottom walls of the batteries 30 of the battery module may be glued to the housing bottom wall 11 through an adhesive and thus fixed in the housing 10. FIG. 12 shows an assembling process in which the battery module is being mounted in the combined structure as shown in FIG. 11, and FIG. 13 shows an assembled structure in which the battery module has been mounted in the housing 10 and the combined structure as shown in FIG. 11.

The second beam 22 is combined with the third beam 23 and the fourth beam 24 by screws, and the protrusion 25 fixedly disposed on the second beam 22 is combined with the fifth beam 50 by screws. FIG. 14 shows a structure in which the second beam 22 and the protrusion 25 are being assembled into the structure as shown in FIG. 13, and FIG. 2 shows an assembled structure in which the second beam 22 and the protrusion 25 have been assembled into the combined structure as shown in FIG. 13.

If a first insulating plate 61 is provided, the first insulating plate 61 is disposed between the first beam 21 and the battery module before the battery module is assembled into the combined structure as shown in FIG. 11 or during a process in which the battery module is being assembled into the combined structure as shown in FIG. 11.

If a second insulating plate 62 or a third insulating plate 63 is provided, after the battery module has been assembled into the combined structure as shown in FIG. 11 and before the second beam 22 and the protrusion 25 are assembled into the combined structure as shown in FIG. 13, the second insulating plate 62 is disposed between the battery module and the second beam 22 or the third insulating plate 63 is disposed between the second beam 22 and the fifth beam 50.

According to the above description, in the battery pack according to embodiments of the disclosure, the frame structure 20 can evenly release the expansion forces of the batteries 30 of the battery module to the two ends of the battery module along the first direction X, which facilitates improving the life cycles of the batteries 30.

Finally, it should be noted that: the above embodiments are intended only to illustrate technical solutions of the disclosure rather than limiting the disclosure; and although the disclosure has been described in detail with reference to preferred embodiments, those of ordinary skill in the art should understand: the specific implementations of the disclosure can still be modified or some technical features can be equivalently replaced, all of which should be covered by the scope of the technical solutions claimed in the disclosure.

What is claimed is:

1. A battery pack, comprising:
a housing comprising a housing bottom wall and a housing side wall, wherein the housing bottom wall and the housing side wall form an accommodating space;
a battery module disposed in the accommodating space and comprising a plurality of batteries, wherein a case side wall of the battery comprises two first side walls oppositely disposed along a first direction and two second side walls oppositely disposed along a second direction, an area of the first side wall is larger than an area of the second side wall, and the first direction and the second direction are both parallel to the housing bottom wall and perpendicular to each other; and
a frame structure disposed in the accommodating space for limiting a position of the battery module, wherein the frame structure comprises a first beam and a second beam respectively located at two ends of the battery module along the first direction, the first beam and the second beam extend along the second direction and are disposed opposite to the first side wall along the first direction, the first beam is non-detachably connected to the housing such that the first beam cannot move relative to the housing, and the second beam is detachably connected to the housing such that the second beam cannot move relative to the housing.

2. The battery pack according to claim 1, wherein the first beam is welded to the housing.

3. The battery pack according to claim 2, wherein the first beam comprises:
a first beam top wall,
a first beam side wall extending towards the housing bottom wall from two ends of the first beam top wall along the first direction; and a first beam mounting edge extending from an end of the first beam side wall close to the housing bottom wall in a direction away from the first beam side wall, wherein the first beam is non-detachably connected to the housing bottom wall through the first beam mounting edge.

4. The battery pack according to claim 3, wherein the second beam is a plate beam.

5. The battery pack according to claim 4, wherein the first beam is integrally formed by bending of a plate, which has a thickness that is 0.2 to 0.5 times a plate thickness of the second beam.

6. The battery pack according to claim 1, wherein the first beam comprises:
   a first beam top wall,
   a first beam side wall extending towards the housing bottom wall from two ends of the first beam top wall along the first direction; and
   a first beam mounting edge extending from an end of the first beam side wall close to the housing bottom wall in a direction away from the first beam side wall, wherein the first beam is non-detachably connected to the housing bottom wall through the first beam mounting edge.

7. The battery pack according to claim 6, wherein the second beam is a plate beam.

8. The battery pack according to claim 7, wherein the first beam is integrally formed by bending of a plate, which has a thickness that is 0.2 to 0.5 times a plate thickness of the second beam.

9. The battery pack according to claim 1, wherein the battery pack further comprises:
   a first insulating plate disposed between the first beam and the battery module; and/or
   a second insulating plate disposed between the second beam and the battery module.

10. The battery pack according to claim 1, wherein the frame structure comprises a third beam and a fourth beam respectively located at two ends of the battery module along the second direction and fixed in the housing, the third beam and the fourth beam extend along the first direction and are disposed opposite to the second side wall along the second direction, and two ends of the second beam along the second direction are detachably connected to an end of the third beam close to the second beam and an end of the fourth beam close to the second beam, respectively.

11. The battery pack according to claim 10, wherein
   the third beam comprises a third beam end recess at the end of the third beam close to the second beam;
   the fourth beam comprises a fourth beam end recess at the end of the fourth beam close to the second beam; and
   the two ends of the second beam along the second direction are respectively disposed in the third beam end recess and the fourth beam end recess and are detachably connected to the third beam and the fourth beam, respectively.

12. The battery pack according to claim 1, wherein a central portion of the second beam along the second direction is detachably connected to the housing.

13. The battery pack according to claim 12, wherein the frame structure comprises a protrusion fixedly disposed on a middle portion of the second beam at a side of the second beam away from the battery module along the first direction, and the middle portion of the second beam is detachably connected to the housing through the protrusion.

14. The battery pack according to claim 13, wherein the battery pack comprises a fifth beam disposed in the accommodating space, the fifth beam extends in the second direction and is located between the second beam and the housing side wall, the second beam is located between the fifth beam and the battery module and has a spacing from the fifth beam in the first direction, the fifth beam is fixedly connected to the housing bottom wall, and the protrusion is detachably connected to the fifth beam.

15. The battery pack according to claim 1, wherein the battery pack comprises a fifth beam disposed in the accommodating space, the fifth beam extends in the second direction and is located at an end of the battery module where the second beam is disposed, the second beam is located between the fifth beam and the battery module and has a spacing from the fifth beam in the first direction, and the fifth beam is fixedly connected to the housing bottom wall.

16. The battery pack according to claim 15, wherein
   the frame structure comprises a third beam and a fourth beam respectively located at two ends of the battery module along the second direction and fixed in the housing, the third beam and the fourth beam extend along the first direction and are disposed opposite to the second side wall along the second direction, two ends of the second beam along the second direction are detachably connected to an end of the third beam close to the second beam and an end of the fourth beam close to the second beam, respectively; and
   the first beam, the second beam, the third beam and the fourth beam have dimensions along a third direction greater than that of the fifth beam along the third direction, and the third direction is perpendicular to the housing bottom wall.

17. The battery pack according to claim 15, wherein
   the frame structure comprises a third beam and a fourth beam respectively located at two ends of the battery module along the second direction and fixed in the housing, the third beam and the fourth beam extend along the first direction and are disposed opposite to the second side wall along the second direction, two ends of the second beam along the second direction are detachably connected to an end of the third beam close to the second beam and an end of the fourth beam close to the second beam, respectively; and
   the end of the third beam close to the second beam and the end of the fourth beam close to the second beam respectively abut against a side of the fifth beam close to the battery module.

18. The battery pack according to claim 15, wherein the second beam comprises a second beam side recess at a side of the second beam close to the housing bottom wall to avoid the fifth beam, and the spacing is formed between the second beam side recess and the fifth beam.

19. The battery pack according to claim 15, wherein the battery pack further comprises a third insulating plate disposed in the spacing.

20. A vehicle comprising:
   a power source configured to provide motive power to the vehicle; and
   a battery pack according to claim 1, wherein the battery pack is configured to provide electric power to the power source.

* * * * *